US007031606B2

(12) United States Patent
Liu et al.

(10) Patent No.: US 7,031,606 B2
(45) Date of Patent: Apr. 18, 2006

(54) METHOD AND SYSTEM FOR MONITORING PERFORMANCE OF OPTICAL NETWORK

(75) Inventors: Wen Liu, Ottawa (CA); Niranjan Vethanayagam, Kanata (CA); Dan Oprea, Kanata (CA)

(73) Assignee: Tropic Networks Inc., Kanata (CA)

( * ) Notice: Subject to any disclaimer, the term of this patent is extended or adjusted under 35 U.S.C. 154(b) by 415 days.

(21) Appl. No.: 09/990,366

(22) Filed: Nov. 23, 2001

(65) Prior Publication Data

US 2003/0099010 A1    May 29, 2003

(51) Int. Cl.
*H04B 10/08*    (2006.01)
*H04B 17/00*    (2006.01)
*H04J 14/02*    (2006.01)

(52) U.S. Cl. ............................. 398/13; 398/14; 398/20; 398/23; 398/32; 398/33; 398/34; 398/37; 398/38; 398/79

(58) Field of Classification Search .................. 398/30, 398/31, 32, 33, 17, 9, 5
See application file for complete search history.

(56) References Cited

U.S. PATENT DOCUMENTS

| 5,513,029 | A | | 4/1996 | Roberts | |
|---|---|---|---|---|---|
| 5,668,658 | A | * | 9/1997 | Hamada | ................ 359/341.43 |
| 5,745,274 | A | * | 4/1998 | Fatehi et al. | ................ 398/198 |
| 5,859,716 | A | * | 1/1999 | O'Sullivan et al. | ........... 398/17 |
| 6,025,949 | A | * | 2/2000 | Anderson | .................... 398/38 |
| 6,559,984 | B1 | * | 5/2003 | Lee et al. | ....................... 398/5 |
| 6,600,581 | B1 | * | 7/2003 | Fatehi et al. | .................... 398/9 |

FOREIGN PATENT DOCUMENTS

CA    2288463    5/2000

OTHER PUBLICATIONS

Ji, H.C. et al. "Optical performance monitoring techniques based on pilot tones for WDM network applications." Journal of Optical Networking, vol. 3, No. 7. Jul. 2004; 510-533.*
Hill, G.R., et al, "A Transport Network Layer Based on Optical Network Elements", Journal of Lightwave Technology, vol. 11, No. 5/6, May/Jun. 1993.
Heismann, Fred, et al, "Signal Tracking and Performance Monitoring in Multi-Wavelength Optical Networks", 22nd European Conference on Optical Communication—ECOC '96, Oslo.

* cited by examiner

*Primary Examiner*—Jason Chan
*Assistant Examiner*—David S. Kim
(74) *Attorney, Agent, or Firm*—Victoria Donnelly

(57) ABSTRACT

The invention describes methods and systems for monitoring the performance of an optical network by introducing a fiber identification (FID) tag and/or bundle identification (BID) tag which are unique to the fiber section and to the bundle of fibers respectively. The FID tag is introduced by marking an optical signal, traveling through a section of fiber, with a low frequency dither tone whose frequency is unique to the fiber section. Similarly, the BID tag is introduced by marking an optical signal, traveling through a section of fiber in a bundle of fibers, with another low frequency dither tone whose frequency is unique to the bundle section. Detecting of the FID and BID tones either alone or along with an optionally introduced channel identification (CID) tone is provided.

3 Claims, 7 Drawing Sheets

METHOD AND SYSTEM FOR MONITORING PERFORMANCE OF OPTICAL NETWORK

FIELD OF THE INVENTION

This invention relates to optical networks, and in particular to methods and systems for monitoring performance of optical networks.

BACKGROUND OF THE INVENTION

It is a common practice in an optical network to introduce a signal tracking mechanism, which would allow the distinguishing and supervising of individual wavelength channels along the optical path. Commonly the tracking mechanism is implemented by modulation of a wavelength channel with a low frequency dither tone, which is unique to the transmitted channel and remains unchanged as the channel travels through the network. This approach has been described in several articles, patents and patent applications, some of which are listed below:
1. U.S. Pat. No. 5,513,029 to Kim Roberts et al;
2. Canadian Patent Application Serial No. 2,288,463 to James Harley;
3. A publication by Fred Heismann, Mohammad T. Fatehi, Steven K. Korotky and John J. Veselka entitled "Signal Tracking and Performance Monitoring in Multi-Wavelength Optical Networks", WeB.2.2., 22nd European Conference on Optical Communications, ECOC '96, Oslo, pp. 3.47–3.50; and
4. A publication by G. R. Hill, P. J. Chidgey, F. Kaufhold, et al, "A Transport Network Layer Based on Optical Network Elements", Journal of Lightwave Technology, Vol. 11, No. 5/6, May/June 1993, pp. 667–679.

Although the approaches described in the cited prior art provide useful information and identification of different optical signals (wavelengths channels) in a network, their origin and power levels, this information alone is limited and not sufficient for the efficient monitoring of the performance of the optical network.

Accordingly, there is a need in industry for the development of improved methods and systems for monitoring performance of optical networks, which would capture more information about the network and therefore would be more accurate and efficient.

SUMMARY OF THE INVENTION

An object of this invention is to provide methods and apparatus for monitoring performance of optical networks, which would overcome some or all of the disadvantages of the monitoring techniques described above.

According to one aspect of the invention there is provided a method for monitoring performance of an optical network, comprising the steps of:
marking an optical signal, traveling through a section of fiber, with a fiber identification (FID) tag which is unique to the fiber section; and
detecting the fiber identification tag at various locations in the network.

Beneficially, the step of marking comprises modulating the optical signal so that the fiber identification tag is encoded onto the optical signal, e.g. by one of the amplitude modulation, frequency modulation, phase modulation, and polarization modulation or combination thereof.

Advantageously, the step of modulating the optical signal is performed so that the optical signal is modulated with the fiber identification tag, which is a low frequency dither signal. Conveniently, the low frequency dither signal is introduced by an amplitude modulation.

Conveniently, the step of detecting the fiber identification tag comprises detecting the tag at a network node, and may further comprise the following steps:
tapping a portion of the optical signal; and
determining one or more of the following parameters from the tapped portion of the optical signal:
(a) frequency of the FID signal;
(b) depth of modulation of the optical signal introduced by the FID signal; and
(c) combined power of FID signals at the FID frequency.

The FID tags may be introduced into the optical signal so that all or selected FID tags are accumulated in the optical signal as the signal travels in the network. Alternatively, the FID tags may be introduced into the optical signal in such a manner that either some or all of the previously introduced FID tags are removed from the optical signal.

According to another aspect of the invention there is provided a method of detecting a fiber failure in an optical network, comprising the steps of:
marking an optical signal, traveling through a section of fiber, with a fiber identification (FID) tag which is unique to the fiber section;
detecting the fiber identification tag at various locations in the network; and
indicating the possibility of fiber failure for the fiber section whose fiber identification tag is not present.

Beneficially, the method further comprises the steps of:
measuring power levels of FID tones at FID frequencies; and
indicating the possibility of one or more of the following:
a fiber section failure if the FID tone for the fiber section is not present;
an amplifier failure if power levels of combined FID tones at different frequencies decrease substantially uniformly;
a transponder failure if the power level of the corresponding FID tone decreases, provided that no channels are being dropped from the respective network node; and
adding or dropping wavelength channels to fiber sections if power levels of the corresponding FID tones change.

According to yet another aspect of the invention there is provided a system for monitoring performance of an optical network, comprising:
means for marking an optical signal, traveling through a section of fiber, with a fiber identification tag which is unique to the fiber section; and
means for detecting the fiber identification tag at various locations in the network.

Advantageously, in the system described above, the means for marking comprises an encoder for encoding a low frequency dither signal onto the optical signal, and the means for detecting comprises a decoder for decoding said low frequency dither signal. Conveniently, the encoder comprises one of the following: high-speed e-VOA (variable optical attenuator), Mach-Zehnder modulator, and electroabsorption modulator.

According to one more aspect of the invention there is provided a method for monitoring performance of an optical network, comprising the steps of:
marking an optical signal, traveling through a section of fiber in a bundle of fibers, with a bundle identification (BID) tag which is unique to the bundle section; and
detecting the bundle identification tag at various locations in the network.

The step of marking may comprise modulating the optical signal with BID signal by using amplitude, phase, frequency, polarization or any other known type of modulation. Beneficially, the step of marking comprises modulating the optical signal with a low frequency dither signal.

According to yet one more aspect of the invention there is provided a system for monitoring performance of an optical network, comprising:

means for marking an optical signal, traveling through a section of fiber in a bundle of fibers, with a bundle identification (BID) tag which is unique to the bundle section; and means for detecting the bundle identification tag at various locations in the network.

Conveniently, the means for marking comprises an encoder for encoding a low frequency dither signal onto the optical signal, and the means for detecting comprises a decoder for decoding said low frequency dither signal.

According to still another aspect of the invention there is provided a method for determining a topology of an optical network, comprising the steps of:

marking an optical signal with a channel identification (CID) tag which is unique to the optical signal;

marking said optical signal, traveling through a fiber section, with a fiber identification (FID) tag which is unique to the fiber section; and detecting the tags at various locations in the network, thereby determining a path of said optical signal in the network.

Beneficially, the method further comprises the step of marking said optical signal, traveling through a fiber section in a bundle section, with a bundle identification (BID) tag which is unique to the bundle section, the step of marking with the BID tag being performed before the step of detecting.

Conveniently, the method further comprises the steps of:

repeating the steps of marking with the CID, FID and BID tags for one of all or some of the optical signals in the network; and identifying the network topology by detecting the tags at various locations in the network and by capturing the information as to which optical signals are traveling through which fiber sections and which bundle sections in the network.

The methods and systems for monitoring performance of the optical networks described above provide the following advantages: Introduction of the FID and BID tags into wavelength channels and detection of their presence and power levels in the network allows more effective and accurate monitoring of the performance of the entire network. In many situations, when fiber and/or fiber bundle information is required, it simplifies the monitoring process by requiring fewer parameters to be measured. Additionally, it allows discovery of the topology of the network which otherwise would not be possible, e.g. to determine paths of individual channels in the network, traffic load and wavelengths channels traveling through particular fiber and bundle sections, and to monitor various scenarios of network failure or changes introduced into the network.

BRIEF DESCRIPTION OF THE DRAWINGS

Embodiments of the invention are described below by way of example only. Reference is made to the accompanying drawings in which.

DETAILED DESCRIPTION OF THE PREFERRED EMBODIMENTS

The first embodiment of the invention describes a method and apparatus for monitoring performance of a dense wavelength division multiplexing (DWDM) network by introducing a fiber identification (FID) tone, or fiber identification tag, associated with a section of fiber between the two nodes in the network. The FID tag is encoded onto an optical signal (wavelength channel) traveling through the section of the fiber, being unique to the fiber section. Optionally the FID tag may be introduced into all or only selected optical signals traveling through the fiber section.

Figure 1:
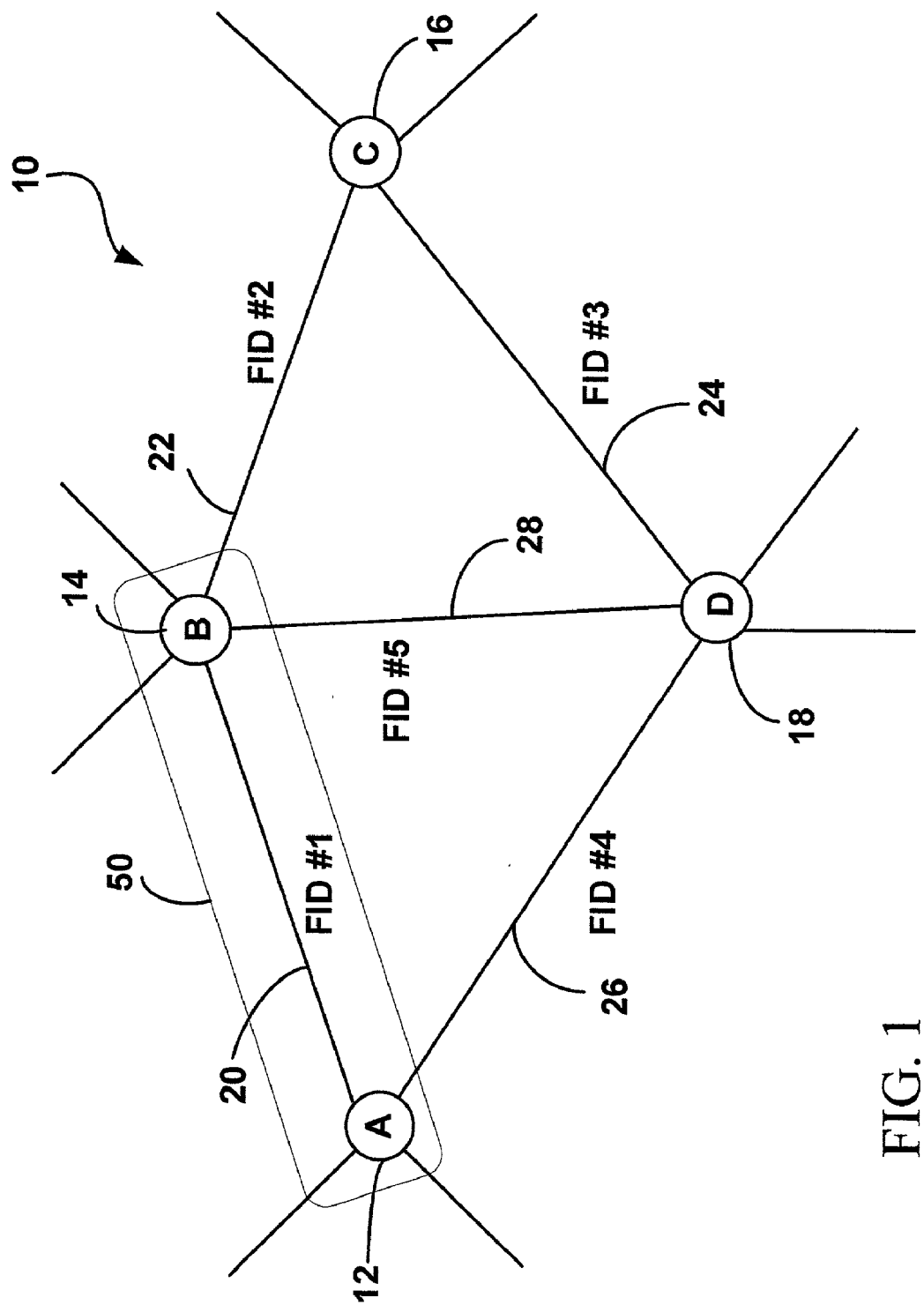
FIG. 1 is a schematic diagram of an optical network, illustrating introduction of a fiber identification tag according to a first embodiment of the invention.

By a way of example, FIG. 1 illustrates an optical network 10 having a plurality of network nodes, four of them being shown in FIG. 1 as nodes A, B, C and D and designated by reference numerals 12, 14, 16 and 18 respectively. For the sake of simplicity, each pair of nodes is connected with one fiber section only, thus five fiber sections in total connecting the four nodes of the network 10 and being shown in FIG. 1. In more detail, fiber section 20 connects nodes 12 and 14, fiber section 22 connects nodes 14 and 16, fiber section 24 connects nodes 16 and 18, fiber section 26 connects nodes 18 and 12, and fiber section 28 connects nodes 14 and 18. In the first embodiment, each wavelength channel entering into a fiber section is marked with the FID tag. The tag is a low frequency dither tone encoded onto the channel, having a frequency preferably about below 1 MHz and a shallow modulation depth, e.g. 1–5% of the optical channel power level. This FID tone remains encoded onto the wavelength channel up until the channel reaches its final destination, while additional FID tones are encoded onto the channel if the channel travels through more than one fiber section in the network. For example, if a wavelength channel travels through all five fiber sections 20 to 28 shown in FIG. 1, the channel is encoded with five fiber identification tones FID#1 to FID #5, each tone having a unique frequency corresponding to the respective fiber section.

Figure 2:
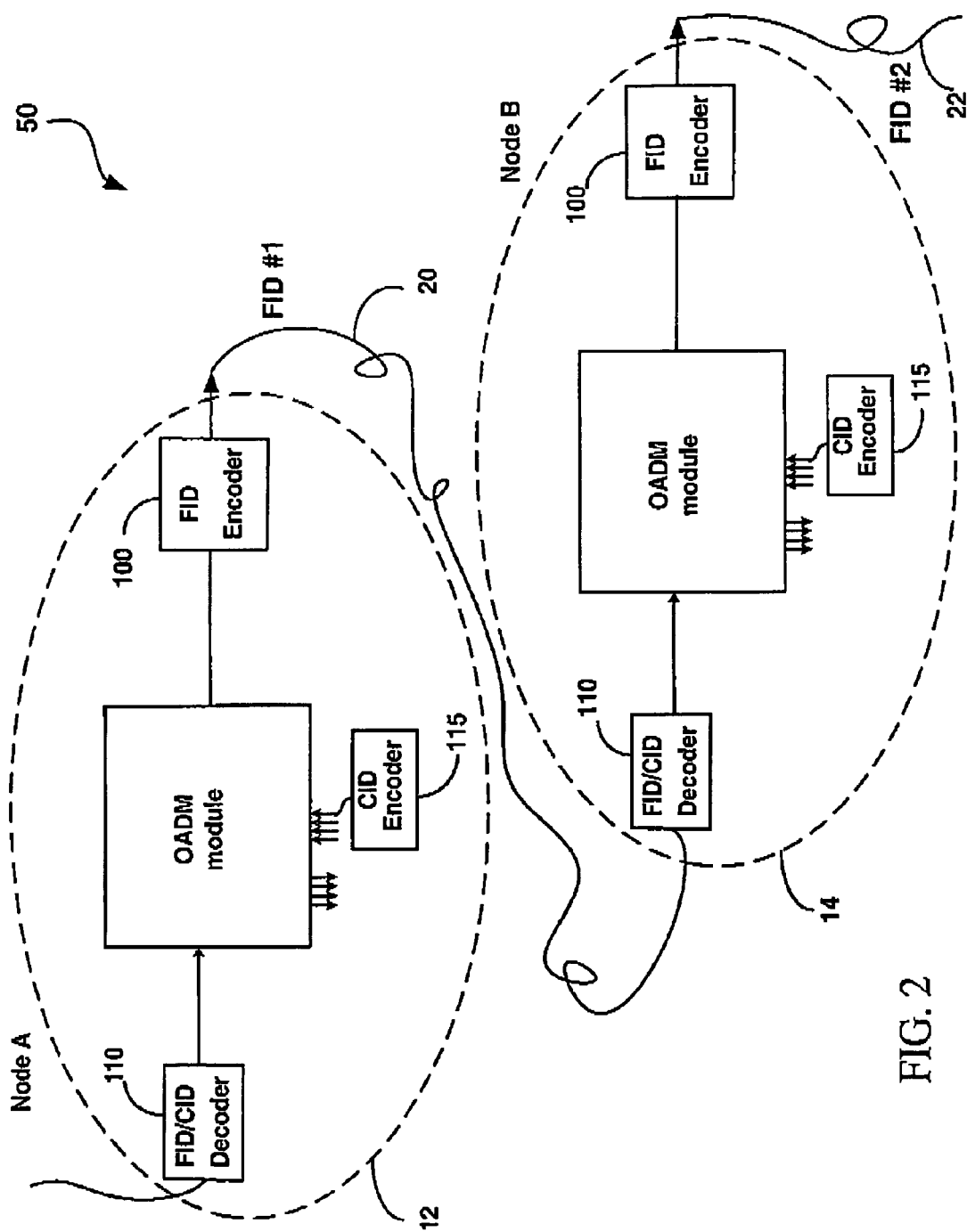
FIG. 2 is a diagram, illustrating placement of fiber identification encoder and decoder in a network node.

The fiber identification tones are detected at various locations in the network, e.g. conveniently at network nodes. FIG. 2 illustrates a section 50 of the network 10 including nodes 12 and 14 in more detail. Each node has a fiber identification encoder 100 for modulating the channel, leaving the node and entering into the fiber section, with the FID tone, and a fiber identification decoder 110 for detecting the encoded information when the channel enters into another network node. Conveniently, the same decoder 110 can be used for detecting both fiber identification (FID) and channel identification (CID) tones, wherein CID is another dither tone, which is unique to the channel and may be optionally encoded onto the channel. Different endcoders 100 and 115 are required for encoding of FID and CID tones respectively.

Figure 3:
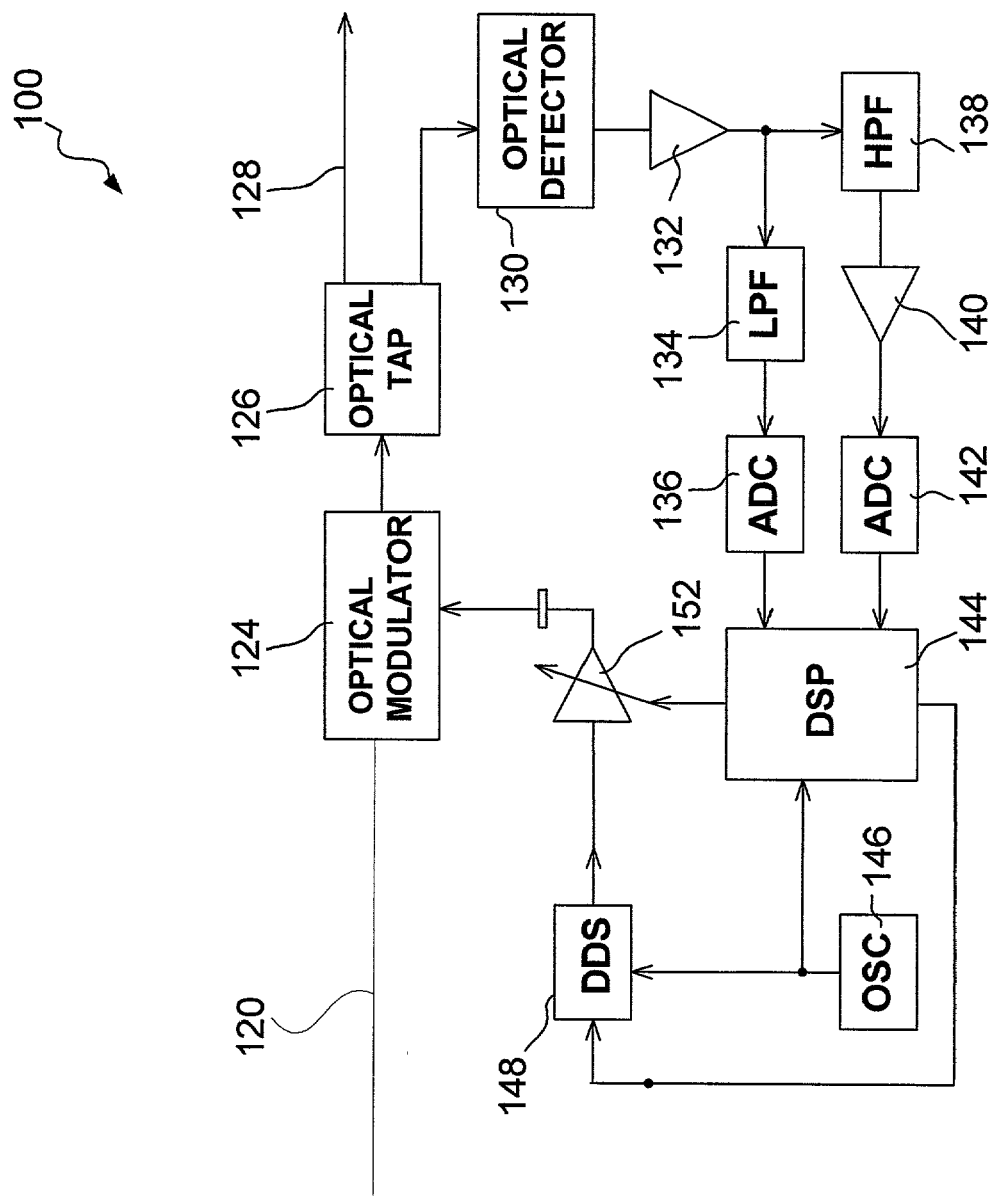
FIG. 3 is a schematic block diagram of the fiber identification encoder.

FIG. 3 illustrates one form of the FID tone encoder 100, which can be used in the embodiment of the invention. Referring to FIG. 3, an optical channel is provided on an optical fiber or path 120 from a modulated laser source (not shown), and is supplied via an optical modulator 124 and an optical tap 126 to an ongoing optical path 128. The optical modulator 124 is preferably an e-VOA (variable optical attenuator), which provides amplitude modulation of the optical channel for fiber identification as described below.

The optical tap 126 supplies a small portion, e.g. 5%, of the optical output of the modulator 24 to an optical detector 130, whose electrical output is amplified by an AGC (automatic gain controlled) amplifier 132. An output of the amplifier 132 is supplied via a low pass filter (LPF) 134 to an analog-to-digital converter (ADC) 136, and via a band pass or high pass filter (HPF) 138 and an amplifier 140 to an ADC 142. The ADCs 136 and 142 produce digital signals, which are supplied to a digital signal processor (DSP) or microprocessor 144.

An oscillator 146 provides a stable source of a signal, for example at a frequency of 50 MHz, which is supplied to the DSP 144 and to a direct digital synthesizer (DDS) or other programmable frequency source 148. DDS 148 is arranged to produce, under programmed control of the DSP 144, a respective dither tone. An output of the DDS 148 is coupled via a controlled gain amplifier 152 and a capacitive coupling to a control input of the optical modulator 124. The gain of the amplifier 152 is controlled by the DSP 144.

In operation, the DDS 148 is arranged to produce continuously a dither tone to be used for identification of the respective fiber section, which will be modulated (encoded) onto the wavelength channel by the optical modulator 124.

The LPF 134 and ADC 136 provide a DC feedback path to the DSP 144, and the HPF 134, amplifier 140, and ADC 142 provide a feedback path to the DSP 144 for the frequency band of the dither tones, in accordance with which the DSP 144 controls the gain of the amplifier 152 to maintain a desired constant depth of modulation by the optical modulator 124. For example, the modulation depth may be about 4%. The use of a constant modulation depth for fiber identification facilitates determining optical power levels in the WDM network in known manner.

Figure 4:
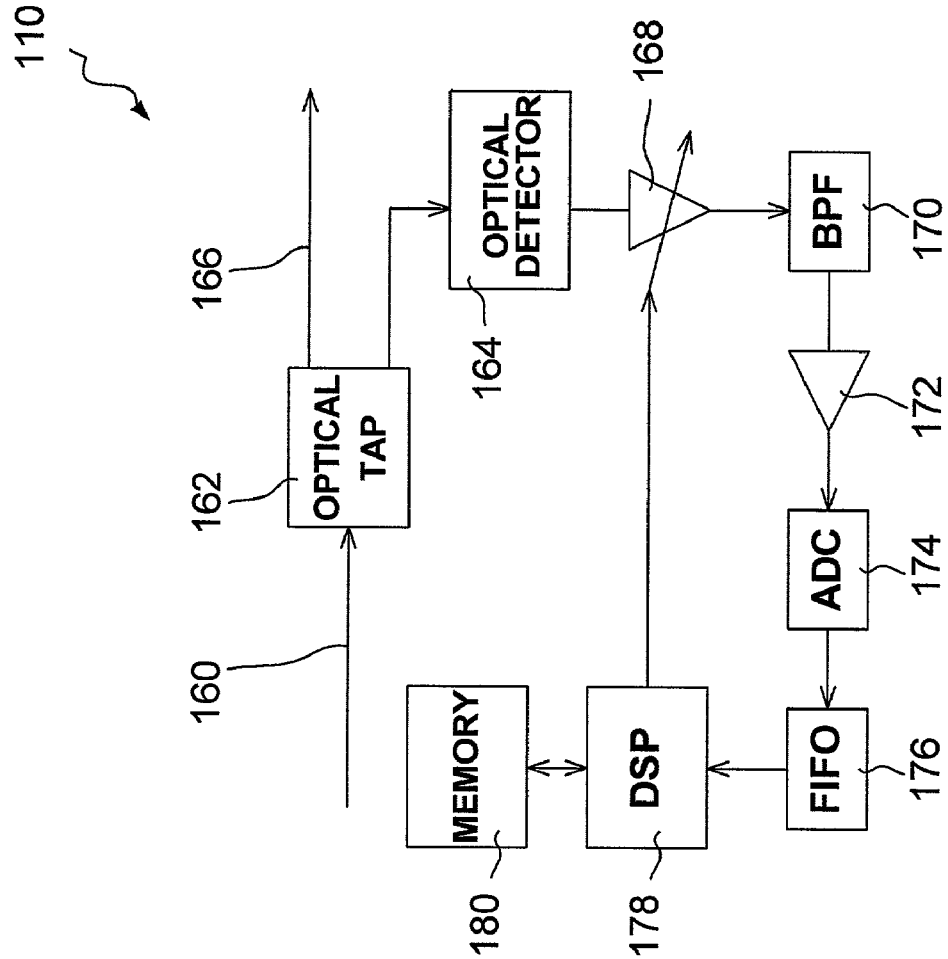
FIG. 4 is a schematic block diagram of the fiber identification decoder.

FIG. 4 illustrates a corresponding FID detector 110 of FIG. 2. Referring to FIG. 4, an optical tap 162 supplies a small portion, e.g. 5%, of an optical signal on the path 160 to an optical detector 164, and supplies most of the optical signal power to an ongoing optical path 166. An electrical output of the optical detector 164 is amplified by a controlled gain amplifier 168, an output of which is supplied via a band pass filter (BPF) 170 and an amplifier 172 to an ADC 174. The BPF 170 has a pass band including the dither tone frequency range. The ADC 174 produces a digital signal, which represents detected dither tones and is supplied via a FIFO (first-in, first-out store) 176 to a digital signal processor or microprocessor 178. The microprocessor 178, which has an associated memory 180, controls the gain of the amplifier 168 in accordance with the power of the optical signal on the path 160.

The DSP 178 operates in known manner to perform Fast Fourier Transform (FFT) processing of the digital signals provided by the ADC 174, using the memory 180 for this FFT processing to detect dither tone modulation of the optical signal on the optical path 160 with the FIFO 176 ensuring that data is not lost during FFT processing by the microprocessor 178. This determines the respective dither tones, and hence the optical fiber identification, in one FFT operation in many instances of typical optical signal power levels.

Figure 5:
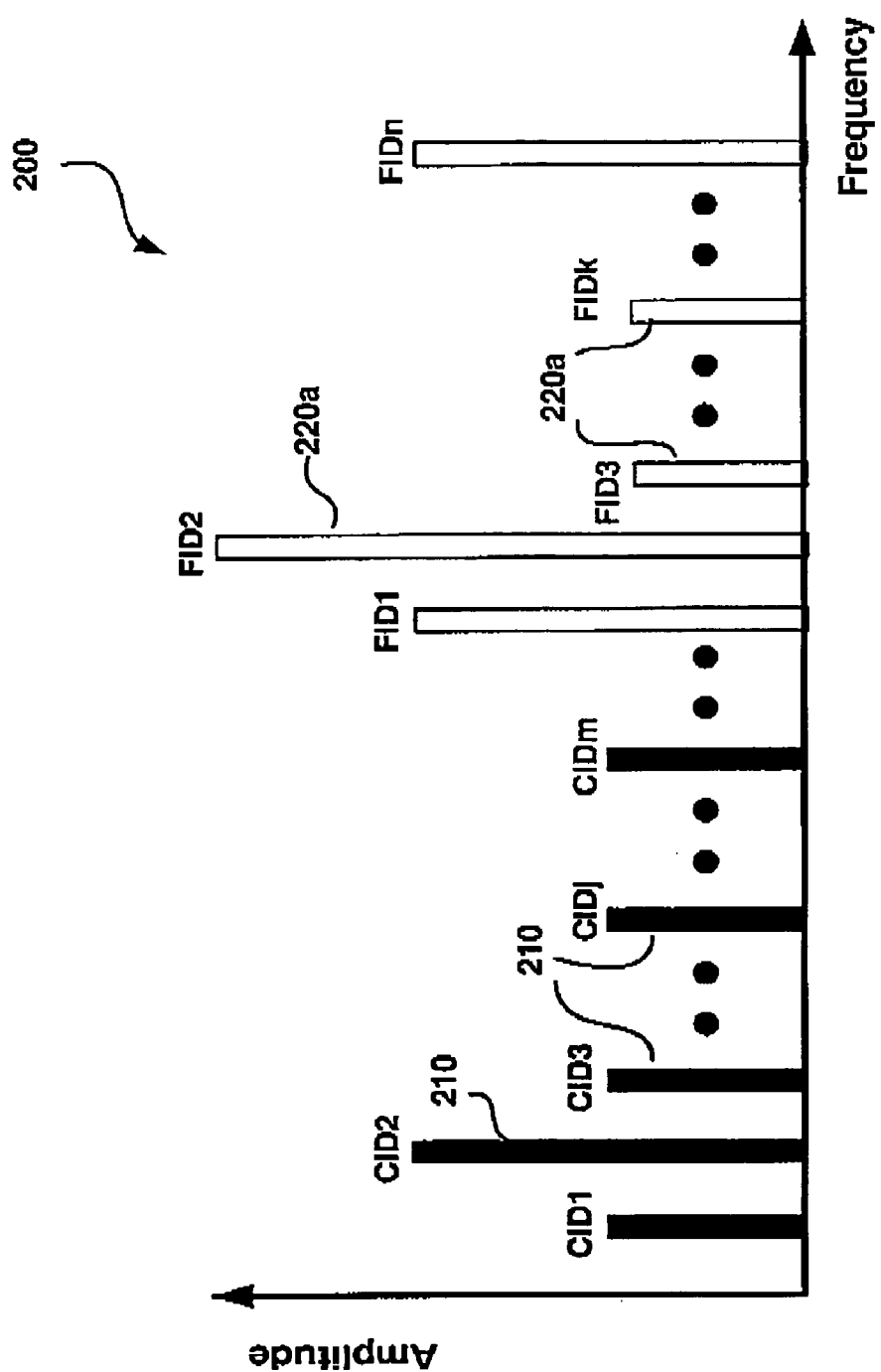
FIG. 5 is a diagram illustrating a Fourier Transform spectrum detected by the decoder of FIG. 4.

A typical Fast Fourier transform (FFT) spectrum 200 received after the FID/CID decoder 110 is shown in FIG. 5. It is assumed that both channel identification (CID) and fiber identification (FID) dither tones have been encoded onto the wavelength channels, and that regions of the spectrum occupied by CID and FID tones do not overlap. The FFT spectrum 200 shows power levels 210 for individual wavelength channels marked as $CID_j$, wherein j=1, . . . , m designates corresponding wavelength channels, and combined power levels 220a of FID tones at FID frequencies. Each FID tone power level measured at a particular FID frequency is comprised of FID tones assigned to the wavelength channels traveling through the corresponding fiber sections marked with this FID tone. The combined power levels of FID tones at FID frequencies are marked as $FID_k$, wherein index k=1, . . . , n designates fiber sections. The spectrum allows for an easy and approximate visualization of traffic load through different fiber sections by comparing power levels at different FID frequencies. If power levels of the channels are equalized, then higher power levels at certain FID frequencies indicate that a higher number of wavelength channels travel through the fiber sections corresponding to these FID tones. If power levels for different channels are not equalized, the FFT spectrum would allow for approximate evaluation of relative traffic load through different fiber sections via approximate comparison of power levels at different FID frequencies. A more detailed evaluation of a network topology, capturing information as to which channels are traveling through which fiber sections in the network at any given instant in time, would require monitoring the presence of both FID and CID tones at various network nodes.

By monitoring the FID tones or a combination of the FID/CID tones, it is possible to monitor the performance of the entire network and/or its elements. For example, indication of the possibility of one or more of the following events in the network can be identified:

a fiber section failure if the FID tone for the fiber section is not present;

an amplifier failure if power levels of combined FID tones at different frequencies decrease substantially uniformly;

a transponder failure if the power level of the corresponding FID tone decreases provided that no channels are being dropped from the respective network node; and adding or dropping wavelength channels to fiber sections if power levels of the corresponding FID tones change.

Additionally, periodic monitoring of the total aggregate power of all FIDs may allow detection of slow degradations in the network.

Table 1 summarizes the comparison of the network performance monitoring capabilities by monitoring CID, FID and combined CID and FID tones.

TABLE 1

Application of FID and CID tones for monitoring performance of a network

| | Channel present or not; | Traffic or path of | Fault indicating when malfunction happens | | Detecting where | Power management | |
|---|---|---|---|---|---|---|---|
| | Channel power monitoring | each channel in a network | Transponder | Fault Fiber location | channels are added in network | For each channel | For each fiber section |
| CID | Yes | | Yes | | | Yes | |
| FID | | | Yes | Yes | Yes | | Yes |
| CID + FID | Yes | Yes | Yes | Yes | Yes | Yes | Yes |

The second embodiment of the invention describes a method and apparatus for monitoring performance of a dense wavelength division multiplexing (DWDM) network by introducing a bundle identification (BID) tone, or bundle identification tag, associated with a bundle (cable) of fibers between the two nodes in the network, where each bundle can carry hundreds of individual fibers.

Figure 6:
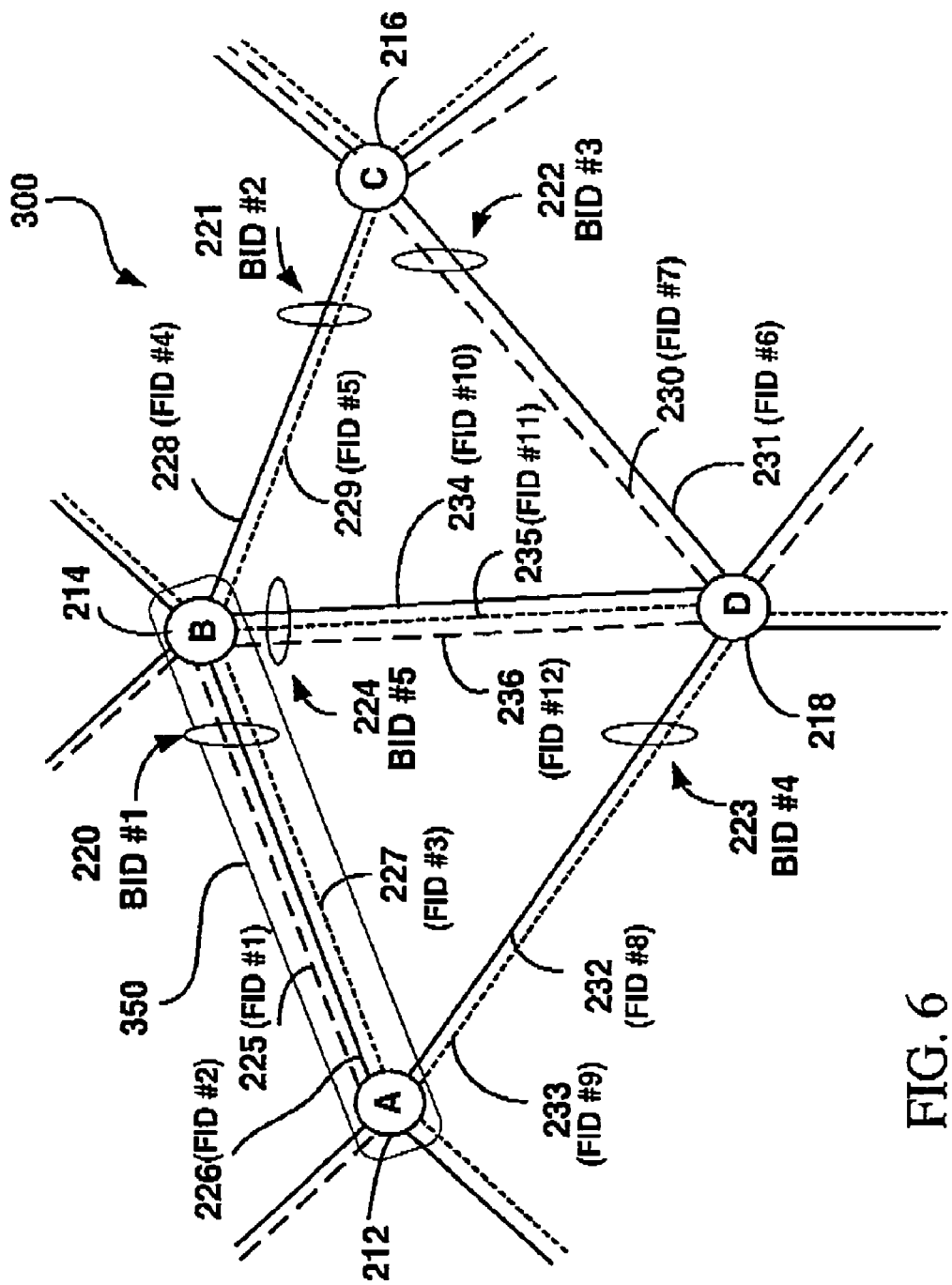
FIG. 6 is a schematic diagram of an optical network, illustrating introduction of a bundle identification tag according to a second embodiment of the invention.

By a way of example, FIG. 6 illustrates an optical network 300 having a plurality of network nodes, four of them being shown in FIG. 6 as nodes A, B, C and D and designated by reference numerals 212, 214, 216 and 218 respectively. The network 300 of the second embodiment is similar the network 10 of the first embodiment except for the pairs of nodes now being connected with bundles of fibers, each bundle having more than one fiber section. Five bundle sections 220, 221, 222, 223 and 224 connecting the four nodes of the network 300 are shown in FIG. 6. In more detail, the bundle section 220, including fiber sections 225, 226 and 227, connects nodes 212 and 214; bundle section 221, including fiber sections 228 and 229, connects nodes 214 and 216; bundle section 222, including fiber sections 230 and 231, connects nodes 216 and 218; bundle section 223, including fiber sections 232 and 233, connects nodes 218 and 212; and bundle section 224, including fiber sections 234, 235 and 236, connects nodes 214 and 218. Each optical signal (wavelength channel) traveling through a bundle section is marked with a unique bundle identification (BID) dither tone associated with the bundle section. The fibers in a bundle are separated at each network node, and each fiber is encoded (modulated) with a unique lower frequency BID dither tone (preferably <1 MHz) having shallow modulation depth, e.g. 1–5% so that the frequency of the dither identifies the particular bundle of fibers. Optionally, an additional FID tone can be encoded onto the wavelength channel in a manner described above with reference to the first embodiment of the invention, thus each channel carrying two identification tones, a BID tone, and a FID tone. Further to the above, an optional CID tone can be encoded onto the optical signal in addition to the FID and BID tones.

Figure 7:
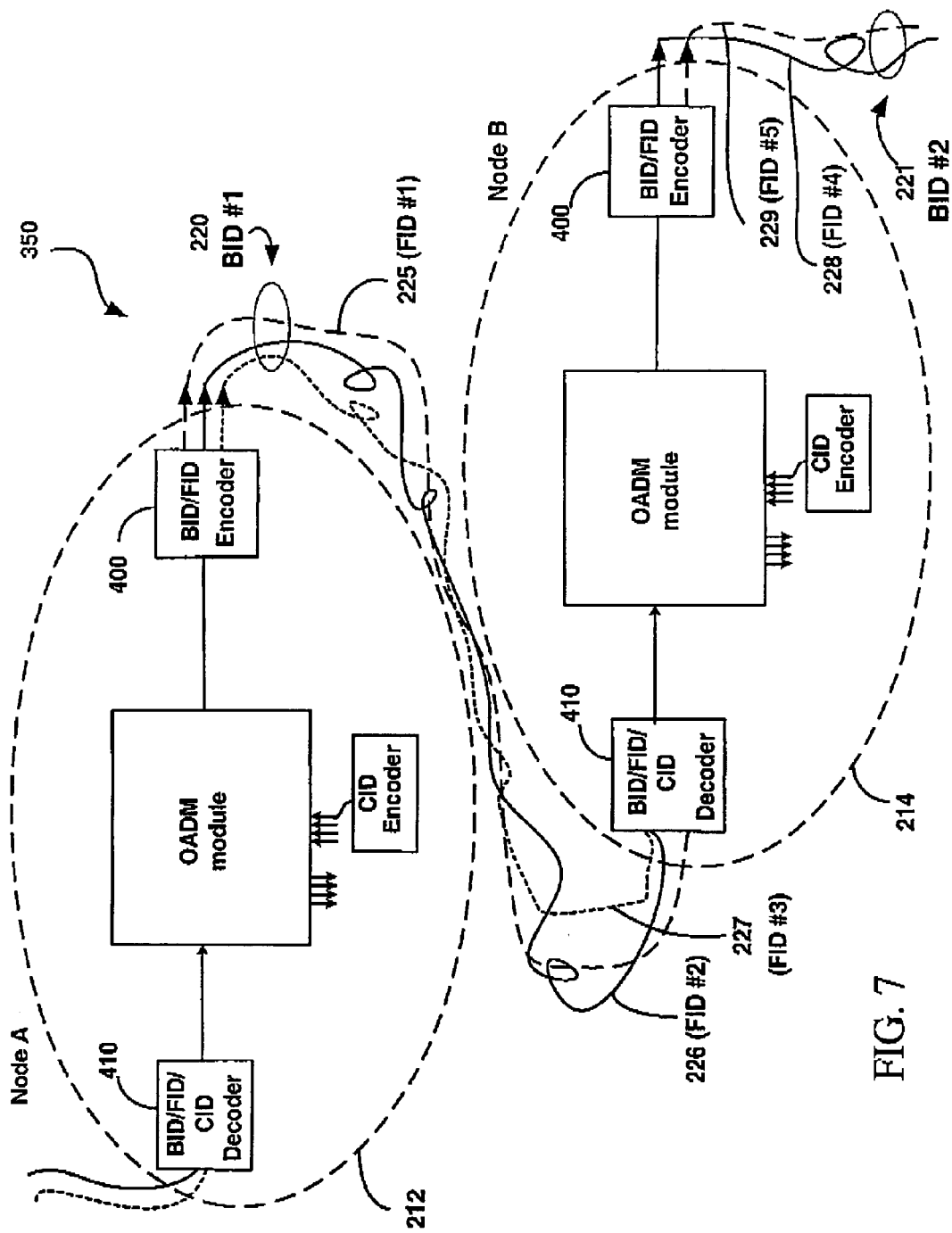
FIG. 7 is a diagram, illustrating placement of a bundle identification encoder and decoder in a network node.

FIG. 7 illustrates a segment 350 of the network 300, which includes nodes 212 and 214, their internal structure and placement of BID/FID endcoders 400 and decoders 410 inside the nodes. For simplicity, only one fiber out of several fibers entering and leaving nodes 212 and 214 is shown inside the nodes 212 and 214. Encoding of the BID tone is performed similar to that of the FID tone as described above. Each node has a bundle identification encoder 400 for modulating the channel, leaving the node and entering into a new bundle section, with the BID tone, and a bundle identification decoder 410 for detecting the encoded BID information when the channel enters into another node in the network. Conveniently, the same decoder 410 can be used for detecting all three BID, FID and CID tones as illustrated in FIG. 7. BID encoding can be done either in a separate BID encoder, or in a combined BID/FID encoder 400 as shown in FIG. 7. The internal structure and operation of the BID encoder and decoder is similar to that of the FID encoder and decoder shown in FIGS. 3 and 4 respectively and described above with regard to the first embodiment. Conveniently, it is arranged so that spectral ranges for FID, BID and CID tones do overlap or interleave with each other. Conveniently, BID tones can be added to wavelength channels traveling through all or only selected fiber bundles in a network, and BID tones can be introduced as unique identifiers or along with other identification tones. Optionally, BID tones can be either accumulated in the wavelength channel as the channel travels through more than one bundle section, or BID tones can be added to the channel and/or removed from the channel at network nodes as required, see e.g. a publication by Fred Heismann (reference #3) cited in the Background section above. If all three BID, FID and CID tones are being encoded onto wavelength channels and detected at various locations in the network, the information collected about the network at any given instant of time can be even more complete and accurate.

Thus, a method and system for monitoring performance of an optical network by introducing fiber section identification tones and bundle section identification tones have been described.

Numerous modifications can be made to the embodiments described above. For example, FID and BID tones can be used separately, in combination with each other, or in combination with CID tones to provide more information about the network performance. FID and BID tones can be added and removed at network nodes, or accumulated in the wavelength channel encoding as the channel travels through the network to its final destination or through only a section of its path in the network.

While the embodiments of the invention have been described with regard to the amplitude modulation of the wavelength channel to introduce FID and/or BID tones, it is also contemplated that other known types of modulation can be also used to introduce FID/BID tags, e.g. phase modulation, frequency modulation or polarization modulation.

In the embodiments described above, marking of different fiber and bundle sections has been performed with dither tones having different frequencies. Alternatively, other ways of introducing FID and BID tones can also be employed, e.g. marking fiber/bundle sections with same frequency, but different modulation depths or different power levels of the dither tones, or combination thereof.

It is worth mentioning that in the embodiments of the invention the term "fiber section" or "fiber" means the length of fiber between the two nodes in the network, wherein the "node" means a location in the network where channels are dropped or added to the network. Similarly, the term "bundle section" or "bundle" means the length of fiber bundle between the two nodes.

While the FID/BID encoder of the preferred embodiment includes a high speed e-VOA (Variable optical attenuator) as an optical modulator, it is also contemplated that other types of modulators suitable for encoding fiber and bundle ID information are also possible, some examples of which include a Mach-Zehnder or EA (electro-absorption) type external modulators. The advantage of the external modulators is that they could provide higher bit rate so that more information could be encoded into the dither tones. Conveniently, some or all of the optical auxiliary channel (OAC) information could also be included into the dither tones if required.

The embodiments of the invention provide the following advantages. Introduction of the FID and BID tags into wavelength channels and detection of their presence and power levels in the network allows more effective and accurate monitoring of the performance of the entire network, and in many cases requires monitoring of fewer number of dither tones. Additionally, it allows discovery of the topology of the network which otherwise would not be possible, e.g. to determine paths of individual channels in the network, traffic load and wavelengths of channels traveling through particular fiber and bundle sections and to monitor various scenarios of network failure or changes.

Although specific embodiments of the invention have been described in detail, it will be apparent to one skilled in the art that variations and modifications to the embodiments may be made within the scope of the following claims.

What is claimed is:

1. A method for monitoring performance of an optical network, comprising the steps of:

(a) intensity modulating each optical wavelength channel of a multi-channel optical signal, traveling through a section of a fiber between two nodes in the optical network, with the same fiber identification (FID) tone, which is a low frequency dither tone whose frequency is unique to the fiber section;

(b) measuring a power level of the FID tone at various locations in the optical network;

(c) indicating the possibility of one or more of the following:

(i) the fiber section failure if the FID tone is not present;

(ii) an amplifier failure in the optical network if combined power levels of different FID tones at different dither tone frequencies decrease substantially uniformly;

(iii) a transponder failure if the power level of the FID tone decreases provided that no optical wavelength channels are being dropped from the respective network node; and (iv) adding or dropping optical wavelength channels to the fiber section if the power level of the FID tone changes; and (d) visualizing an approximate traffic load through different fiber sections in the optical network by comparatively displaying power levels of FID tones at different FID tone frequencies, thus indicating that fiber sections having higher power levels of the FID tones carry larger numbers of optical wavelength channels.

2. The method as described in claim 1, wherein the step (a) further comprises equalizing power levels of said optical wavelength channels.

3. The method as described in claim 2, wherein the step (a) comprises intensity modulating optical signals traveling through different fiber sections in the optical network with FID tones having different dither tone frequencies and same modulation depth.

* * * * *